May 30, 1950  H. G. ALLEN ET AL  2,509,715
TUBE MACHINE

Filed Oct. 31, 1945  7 Sheets-Sheet 1

Howard G. Allen INVENTOR
BY Charles D. Thomas
Pennie, Davis, Marvin & Edmonds
ATTORNEYS

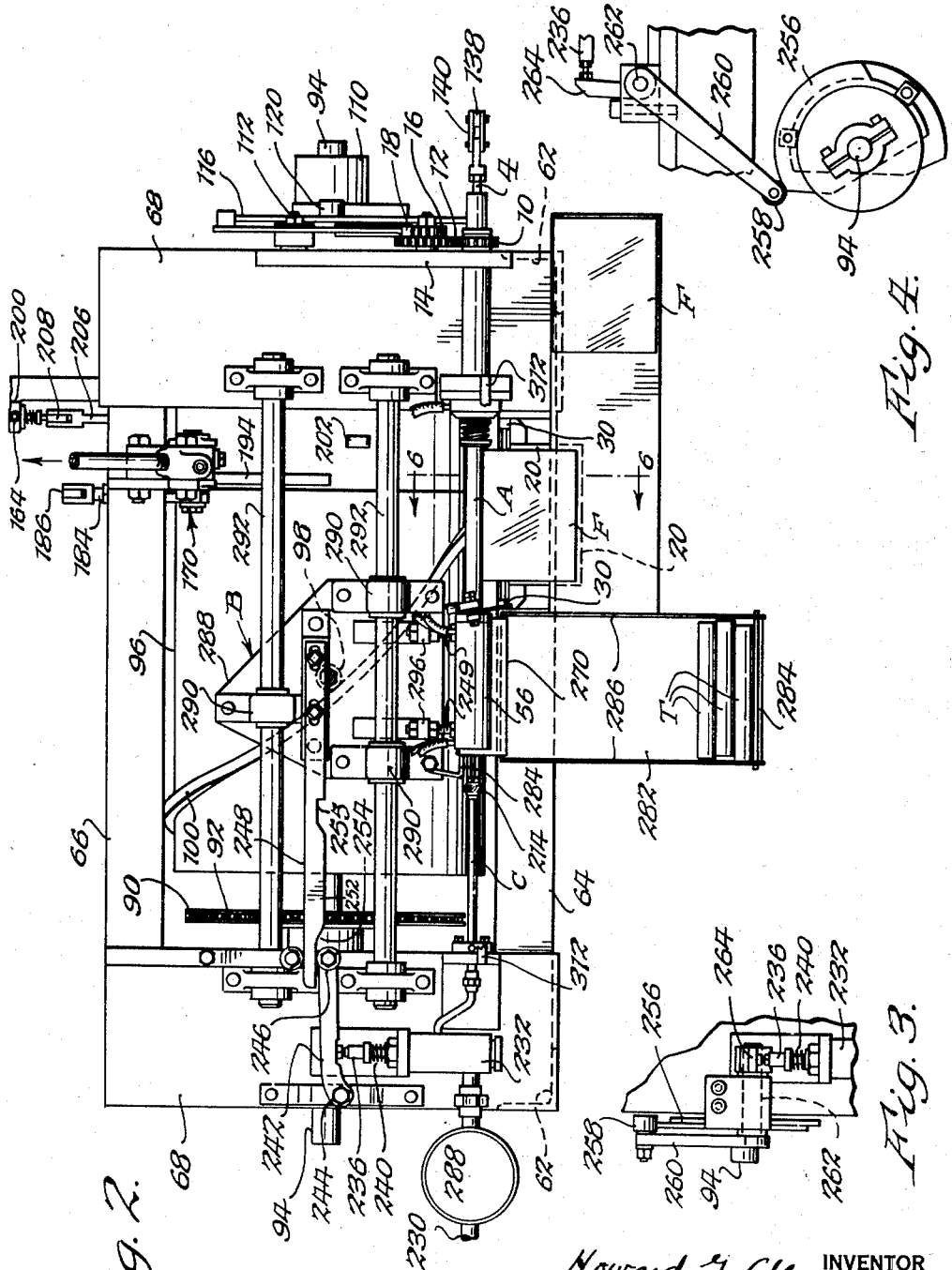

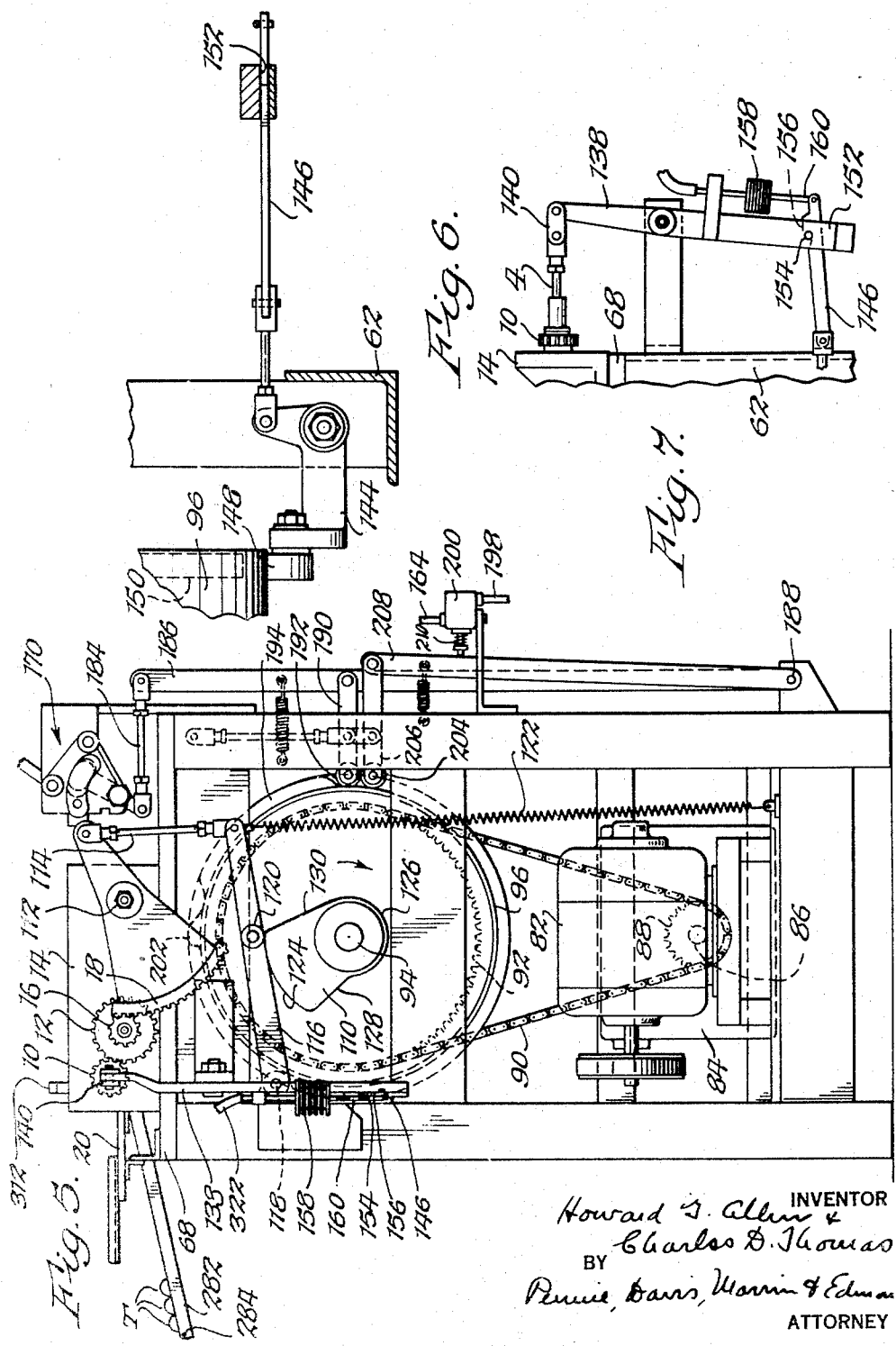

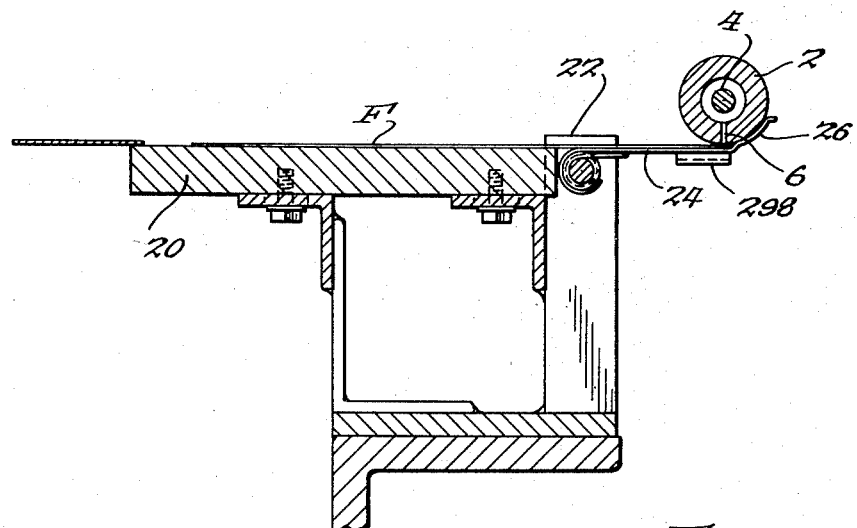
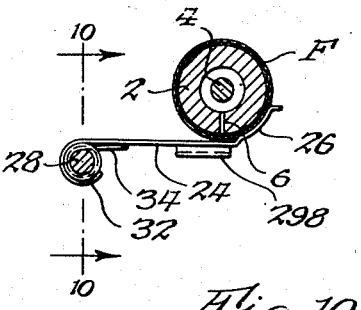
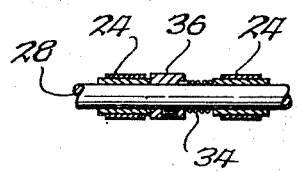
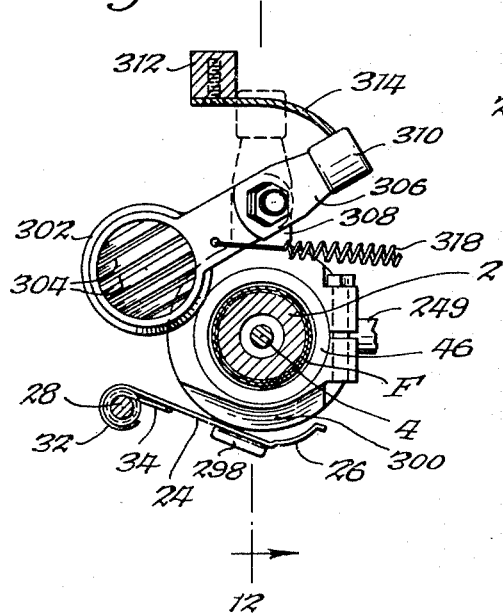

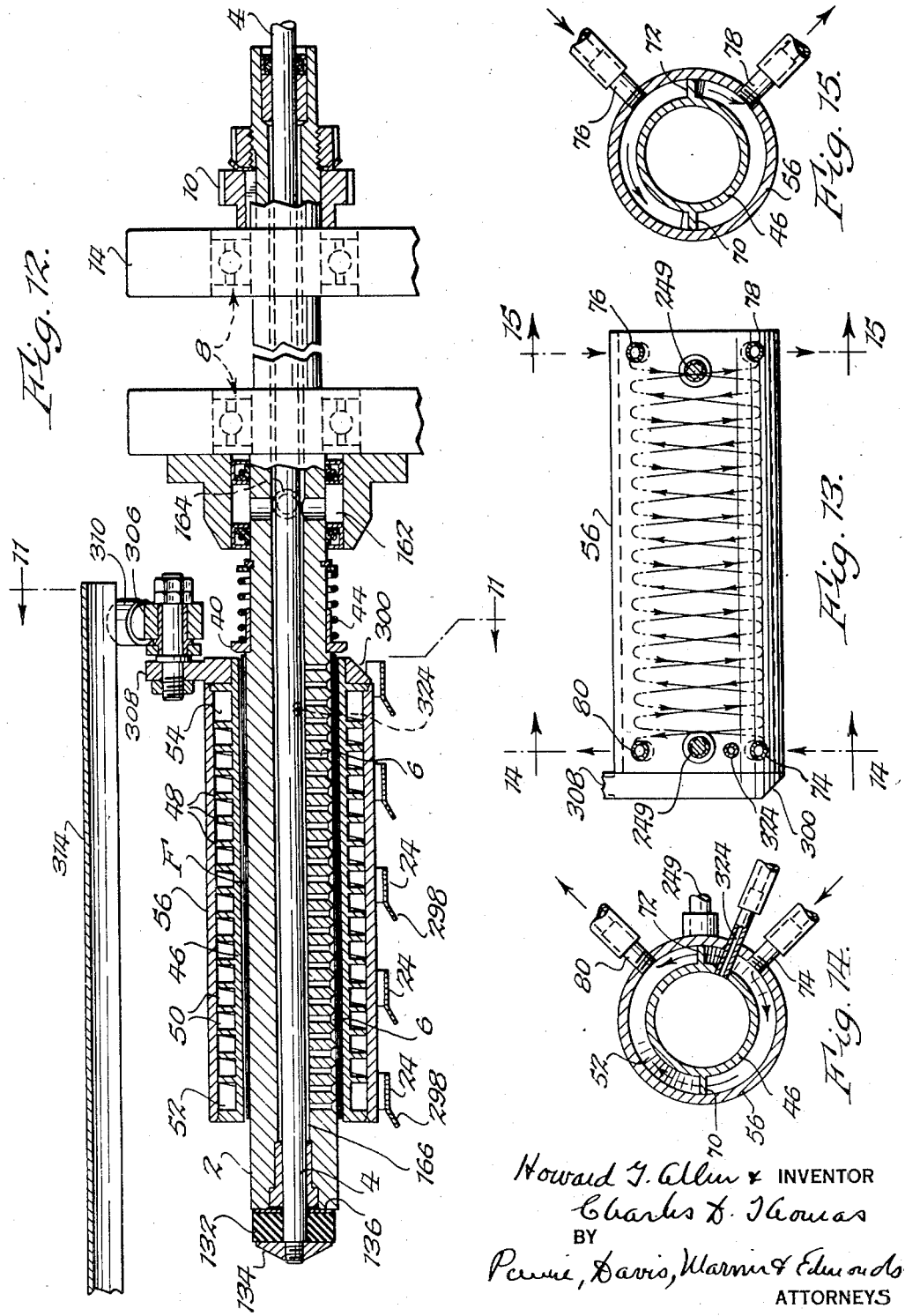

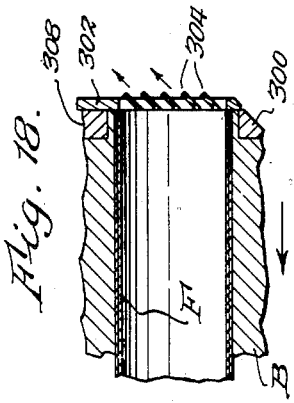
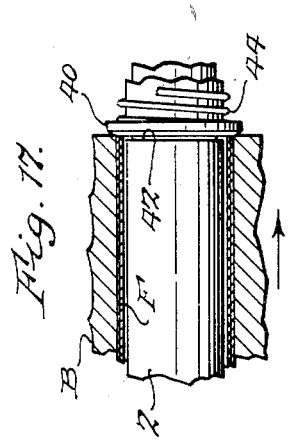
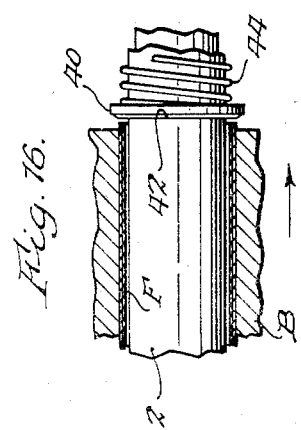
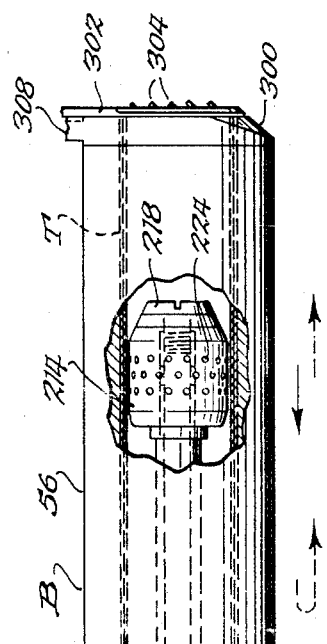
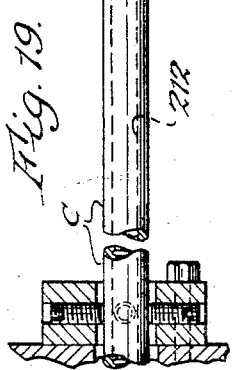

May 30, 1950  H. G. ALLEN ET AL  2,509,715
TUBE MACHINE
Filed Oct. 31, 1945  7 Sheets-Sheet 7
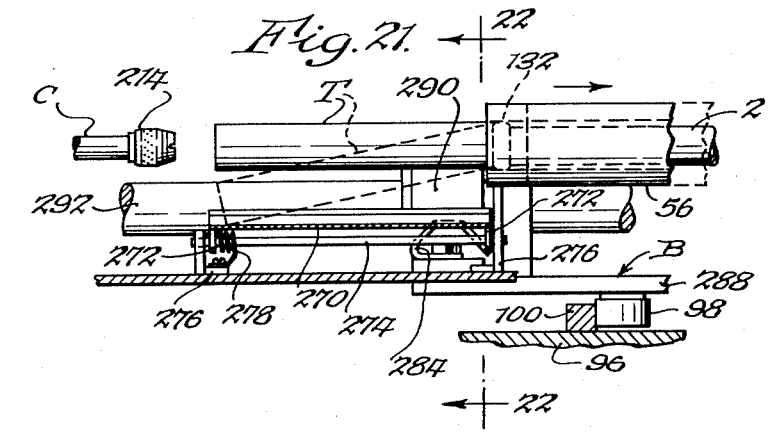
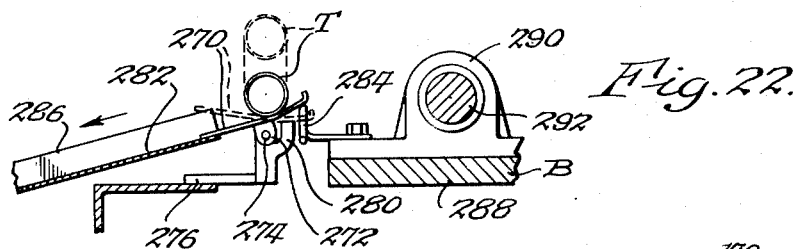
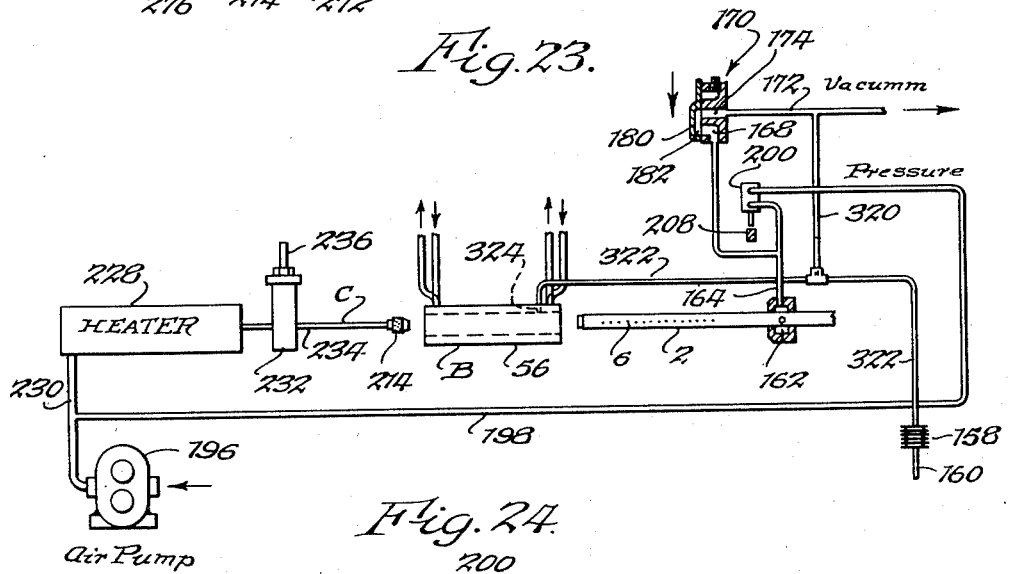
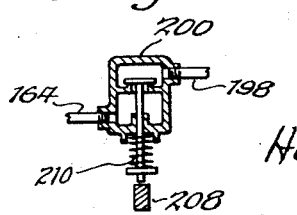
INVENTOR
Howard G. Allen &
BY Charles D. Thomas
Pennie, Davis, Marvin & Edmonds
ATTORNEYS Patented May 30, 1950

2,509,715

UNITED STATES PATENT OFFICE 2,509,715

TUBE MACHINE

Howard George Allen, Niagara Falls, and Charles Dellinger Thomas, Hamburg, N. Y., assignors to American Type Founders, Inc., Elizabeth, N. J., a corporation of New Jersey Application October 31, 1945, Serial No. 625,762

22 Claims. (Cl. 93—81)

This invention relates to a machine for making tubular bodies and more particularly to a machine for forming tubes from sheet material, such as plastics, metal foil, specific forms of paper and various other non-fibrous or fibrous sheets or films. Unless the material, such as a plastic, is capable of fusing to itself by heat, the film or foil is coated with a thermoplastic, thermosetting or pressure sealable material so that the original sheet or foil may be wound to the desired number of thicknesses and then these layers sealed throughout to each other to form a tube.

In our prior application Serial No. 586,344, filed April 3, 1945, we have disclosed a method of forming tubes from sheet material in which the material is rolled, placed in a die, and submitted to a fluid, such as heated air, to expand the roll of material against the wall of the die and seal the layers of the material to each other to form a tubular body.

The present invention relates to a machine for carrying out the process of our prior application in which the operations are more nearly automatic and in which the sheet material is wound upon a rotating mandrel to form the roll from which the tube is to be made. The mandrel, arranged at one end of the machine, is intermittently rotated and is provided with openings connected to a source of vacuum whereby the sheets of foil or other material may be fed to the mandrel at the beginning of rotation and with the ports or openings connected to the vacuum source to cause the sheet material to wind about the mandrel.

At the opposite end of the machine we provide a fusing nozzle, generally similar to that disclosed in our prior application which is arranged in alignment with the mandrel. A carriage is mounted to reciprocate on the bed of the machine and it carries a die which moves into position over the mandrel after the roll of material has been wound on the mandrel, receives the roll of material and then travels to the opposite end of the machine over the fusing nozzle. While the die is over the nozzle, heated air is delivered to the nozzle ports inside the roll of material causing the roll of material to expand against the inner wall of the die and causing the layers of material to become fused to each other. While the die is moved over the fusing nozzle, the mandrel is rotated in a reverse direction to bring the vacuum ports into proper position to receive the leading edge of the next sheet of material for the next operation. As the die moves from its position over the fusing nozzle back toward the mandrel, the finished tube is ejected.

In the accompanying drawings we have shown one embodiment of the invention. In this showing:

Fig. 2 is a plan view;

Fig. 3 is a detailed view of an alternative form of control for the valve which controls the flow of heated air to the fusing nozzle;

Fig. 4 is a similar view at right angles to Fig. 3;

Fig. 5 is an end elevation of the machine;

Fig. 6 is a detailed, sectional view on line 6—6 of Fig. 1;

Fig. 7 is a detailed view of a part of the tube ejecting means;

Fig. 8 is a detailed, vertical, sectional view showing the mandrel and showing spring fingers which cooperate with the mandrel in feeding the sheets of material to it, the sheet or foil being in position to wind on the mandrel;

Fig. 9 is a similar view showing the sheet wound on the mandrel;

Fig. 10 is a detailed, sectional view on line 10—10 of Fig. 9;

Fig. 11 is a vertical, sectional view with the die in position on the mandrel taken on line 11—11 of Fig. 12;

Fig. 12 is a sectional view at right angles to Fig. 11 taken on line 12—12 of Fig. 11 and showing the construction of the die to provide for cooling;

Fig. 13 is a rear view of the die diagrammatically illustrating the counter-current flow of the cooling fluid;

Fig. 14 is a vertical, sectional view on line 14—14 of Fig. 13;

Fig. 15 is a similar view on line 15—15 of Fig. 13;

Fig. 16 is a detailed, sectional view of the die and mandrel illustrating an alternative method of properly positioning the edge of the sheet with respect to the die and mandrel;

Fig. 17 is a similar view in which the die has moved to the right and has reached the end of its movement over the mandrel;

Fig. 18 is a detailed, sectional view of the die showing the safety gate in closed position;

Fig. 19 is a diagrammatic view showing the die in position over the fusing nozzle at an intermediate point;

Fig. 20 is a similar view in which the die is moved to the right over the end of the mandrel illustrating the tube ejecting means;

Fig. 21 is a vertical, detailed view showing the die in a position further toward its end of travel over the mandrel and illustrating the way in which the tube falls from the die;

Fig. 22 is a view at right angles to Fig. 21 illustrating the discharge chute for the finished tubes;

Fig. 23 is a diagrammatic view of the vacuum and pressure connections to the mandrel and fusing nozzle; and Fig. 24 is a detailed view of a valve employed to supply air under pressure to the mandrel immediately after the vacuum has been cut off to prevent the roll of material from clinging to the mandrel instead of expanding against the wall of the die.

Figure 1:
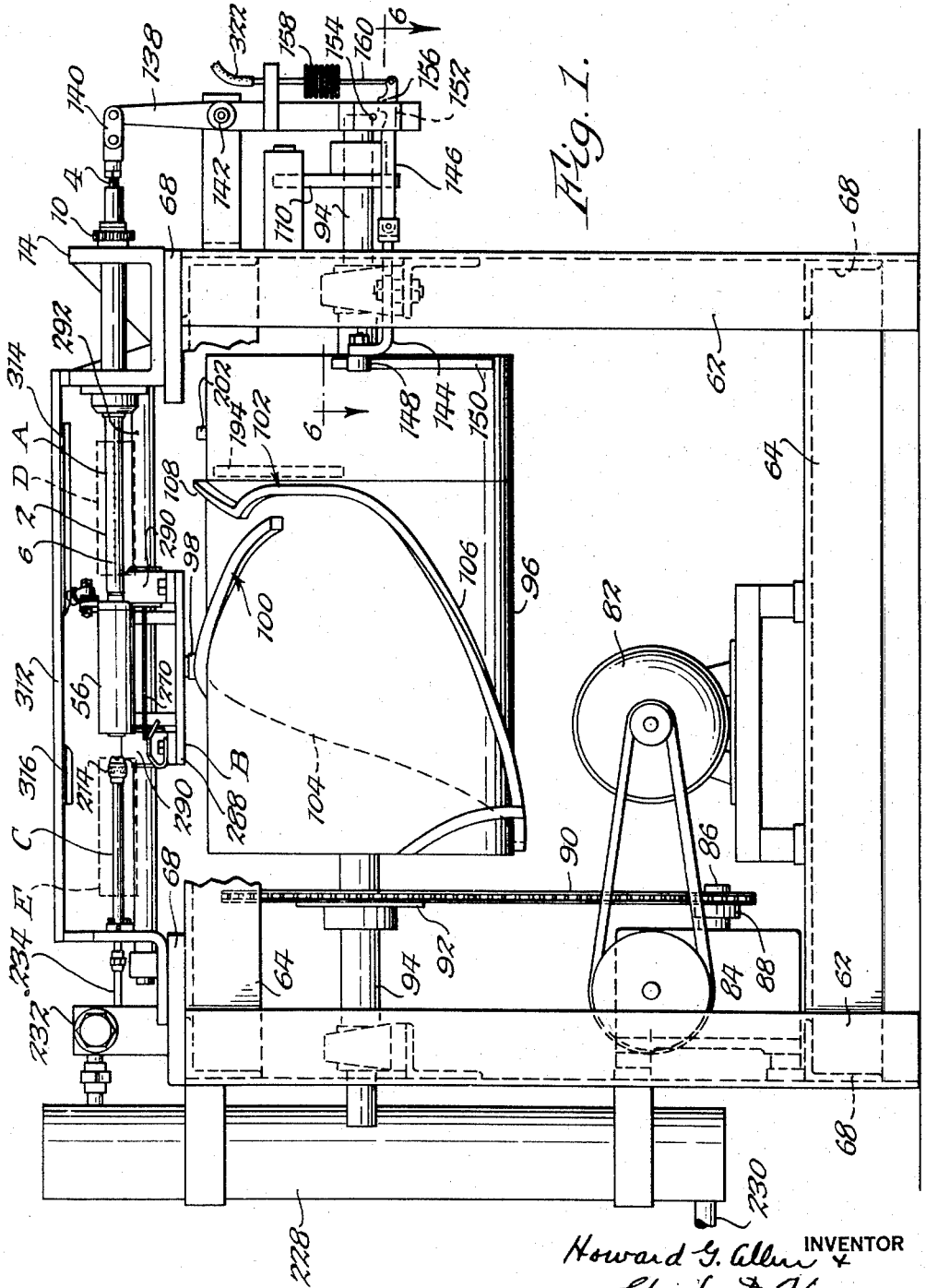
Fig. 1 is a front elevation of the machine, parts being broken away to more clearly illustrate some of the features.

Referring first to Figs. 1, 2 and 5 of the drawings, the machine comprises suitable legs 62 connected by longitudinal members 64 and 66 at the front and back of the machine and transverse end members 68. The working parts or groups of elements consist of a mandrel A which is the foil winding mechanism, a reciprocating carriage B in which the die is mounted, and a fusing nozzle C. The mandrel A and the fusing nozzle C are in alignment with each other, the nozzle being stationary and the mandrel being rotatable. The die is arranged axially of these two parts and reciprocates from the center position shown in full lines in Fig. 1 of the drawings first to the right to receive the wound foil from the mandrel to the position indicated in dotted lines at D and then to the left over the fusing nozzle to seal the layers of the tube to each other to the position indicated in dotted lines at E in Fig. 1 of the drawings.

The foil winding device or mandrel comprises a tube 2 having an axial rod 4 arranged therein, this rod not being rotatable with the tube but being capable of limited endwise movement. The mandrel is provided with a plurality of substantially radial ports 6 arranged in alignment with each other and extending longitudinally of the mandrel a distance slightly less than the width of the coil to be wound. The mandrel extends beyond the foil winding zone and is mounted in spaced bearings 8. A pinion 10 is arranged on the mandrel beyond the bearings. This pinion meshes with a gear 12 (see Fig. 5) mounted on a stub shaft supported in a plate or bracket 14 on the end of the machine. This stub shaft also carries a pinion 16 meshing with a sector gear 18 by means of which the mandrel is rotated when the sheet of foil is fed to it to wind the foil on the mandrel in the desired number of layers.

The foil is fed to the mandrel with the parts in the position shown in Figs. 1 and 2, that is, with the carriage B at a position intermediate its path of travel and with the ports 6 of the mandrel in position to apply suction to a sheet of foil fed to the mandrel as shown in Fig. 8 of the drawings. The foil is placed on table 20 with its right edge against stop 22 to properly position it with respect to the mandrel. The sheet is then moved toward the mandrel which, at that time, is stationary with ports 6 positioned to align with the advance edge of foil. The suction is then started and the mandrel is rotated. The suction openings 6, engaging the surface of the foil near its edge, cause it to wind on the mandrel. Beyond the edge of table 20 we provide a plurality of spring fingers 24 having curved ends 26 to assist in guiding or feeding the foil around the mandrel and retain the foil in wound condition until the die moves in over it. These fingers are mounted on a rod 28 which extends along the frame of the machine and is journalled in the frame at 30 (see Fig. 2). The ends of the fingers 24 are curled around the rod as at 32 (see Fig. 9) and the fingers are urged upwardly by coil springs 34. One end of each spring is secured to a sleeve 36 which is screwed to the rod 28 (see Fig. 10) and the other end 38 of the spring engages the under side of the finger 24 to force it upwardly toward the mandrel.

An alternative method of positioning the foil with respect to the mandrel is shown in Figs. 16 and 17. As there shown, a sliding collar 40 is placed on the mandrel and normally engages a shoulder 42 adjacent the extreme limit of the path of movement of the carriage B. The collar is urged toward the shoulder by a coil spring 44 surrounding the mandrel and having its other end bearing against an annular projection on the mandrel. Shoulder 42 is a little to the right of the stop 22 and after the die B has arrived at the point shown in Fig. 16, at which time the vacuum is released as hereinafter described, the die carries the rolled foil toward the right causing it to engage the collar 40 and shove the collar to the right as shown in Fig. 17. The portion of the foil extending beyond the end of the die, as shown in Fig. 16, is thus engaged by the collar and held relative to the die so that at the end of the stroke it will be flush with or projecting a very slight distance beyond the end of the die.

The detailed construction of the die is shown in Figs. 12 to 15. It consists of an inner cylinder 46 which forms the die, or the wall against which the layers of foil F are expanded to form the tube. Its inner diameter is greater than the diameter of the mandrel, providing a slight clearance between them. Exteriorly of the cylinder 46 we provide double spiral threads or fins 48 forming a series of chambers 50 along the die terminating in annular end chambers 52 and 54. An outer sleeve 56 is welded or brazed into contact with the end walls and engages the outer peripheral edges of the fins 48. Baffles 70 and 72 are arranged in the end chambers 52 and 54 (see Fig. 14) diametrically opposite each other to divide these chambers and provide separate spiral passages in the die along the fins as indicated in Fig. 13. Air or other cooling medium is introduced into these passages at opposite ends through inlets 74 and 76 and discharged through outlets 78 and 80. Thus the air entering at one end is flowing counter-current to the air which has extracted heat from the die and which was admitted at the other end and when it approaches the other end of the die and has become heated, it is flowing counter-current to the cooler air which has just been admitted at that end of the die. More uniform cooling of the die is thus obtained than if the air were admitted and flowed through a single spiral passage from one end of the die to the other.

The machine is driven from a motor 82 (see Figs. 1 and 5) which is connected to suitable gear reduction mechanism 84, having a driven shaft 86 carrying a sprocket 88. This sprocket drives a chain 90 which passes over a second sprocket 92 on main shaft 94. A cam drum 96 is mounted on this shaft beneath the bed or table of the machine. The carriage B is provided with a roller 98 which is adapted to engage cams 100 and 102 on the cam drum to reciprocate the carriage from the dotted line position indicated at D in Fig. 1 to the dotted line position shown at E and return it to the original position. The inclined portion 104 of cam 100 is steeper than the corresponding portion 106 of cam 102. The portion 104 controls the movement of the carriage as it moves over the fusing nozzle and more rapid movement is there desired to prevent overheating of the tube or to obtain rapid preheat. The portion 106 controls the movement in the opposite direction and provides a longer period for the sealing of the foil. To prevent jamming when the roller 98 moves from engagement with one of the cams into engagement with the other, the cams are provided with flared ends or extensions 108.

The sector gear 18 which controls the rotation of the mandrel is actuated from a cam 110 mounted on the shaft 94 (see Fig. 5). Sector gear 18 is mounted on a shaft 112 carried by the plate or bracket 14 and link 114 is connected to the sector gear. The link is in turn pivoted to a lever 116 pivotally mounted on the frame of the machine at 118. Lever 116 carries a roller or follower 120 which engages cam 110. The follower is held in engagement with the cam by means of a spring 122 which is secured to the lever 116 and to the frame of the machine. Cam 110 is provided with concentric portions 126 and 124. While the follower is in contact with the concentric portions, the mandrel is stationary. When it is in contact with the portion 124, the carriage moves over the mandrel to receive a rolled foil and then moves off again. As the follower rides over straight portion 128 of the cam, the mandrel is rotated in a reverse direction to bring the ports 6 into proper position for winding the next sheet of foil. The mandrel again remains stationary while the follower passes over the concentric portion 126 and when a new sheet of foil is to be wound, the mandrel is rotated by engagement of the roller with the straight portion 130 of the cam.

The rod 4 is provided with a rubber plug 132 on its outer end confined between a nut 134 on the threaded reduced end of the rod and a washer 136. As the die with a completed tube in it moves over the mandrel, the plug 132 is expanded by reciprocation of the rod to eject the tube from the mandrel (see Fig. 20). The means for reciprocating the rod is shown in Figs. 1, 6 and 7. The end of rod 4 is connected to a lever 138 by means of a link 140, the lever 138 being pivoted at 142 on a bracket carried by the machine. The lower end of a lever 138 is connected to a rocker 144 by means of a link 146. Rocker 144 carries a follower 148 engaging a cam track 150 on the drum 96. Thus, when the link 146 is connected to the lever 138 and the follower 148 engages the cam track, the rocker 144 is turned on its pivot to actuate the lever 138 and reciprocate the rod 4 to axially compress the plug 132 and expand it radially.

Means are provided to disconnect the link 146 from the lever 138 if there is no tube in the die and thus reduce wear on the plug 132. As shown (see Figs. 6 and 7), the lever is provided with a slot 152 having a pin 154 extending across the slot and link 146 passes through this slot and is provided with a hook 156 to engage the pin. Sylphon bellows 158 is connected to the end of the link as at 160 and when a vacuum is created in the bellows, link 156 is raised to cause the hook to engage the pin and thus actuate the lever 138. When there is no vacuum in the bellows 158, the link 146 is in the lowered position shown in Fig. 1 of the drawings with the hook disengaged from the pin so the lever 138 is not actuated by engagement of the follower 148 and the cam 150. Means for removing the vacuum from the bellows 158 when there is no tube in the die will be later described.

The means for connecting the mandrel to a source of suction during the period when it is rotated to roll the sheet is shown in Figs. 12 and 23. As shown, the mandrel is provided with a chamber 162 connected to a suction pipe 164. This chamber communicates with the ports 6 through a space 166 surrounding the rod 4. The suction pipe is connected to a port 168 in a valve 170. The valve 170 is mounted at a convenient point on the machine as shown in Fig. 5 of the drawings. Valve 170 is connected to a source of suction through a pipe 172. This pipe communicates with a port 174 arranged adjacent the port 168. Communication between the vacuum source and pipe 164 is controlled by a movable plate 180 which is recessed or offset at 182 to provide a communicating passage between the ports. The movable member of the valve, or plate 180, is shifted by means of a link 184 connected to it and in turn connected to a lever 186 pivoted on the frame of the machine as at 188 (see Fig. 5). This lever carries an arm 190 having a follower 192 at its outer end which in turn engages a cam 194 on the drum. When the cam actuates the lever 186 to shift the plate 180 and bring the ports 168 and 174 into communication, the chamber 162 is connected to the source of suction while the mandrel is being rotated to wind the sheet into a roll.

When the die comes over the mandrel to receive the rolled sheet, the sheet some times has a tendency to cling to the mandrel and this is prevented by introducing a short blast of air into the mandrel directly after the vacuum has been cut. Pipe 164 is connected to air pump 196 by an air line 198 having a valve 200 arranged therein. This valve is arranged on the frame of the machine as shown in Fig. 5 and is operated by a short cam 202 on the drum 96 (see Fig. 1). Cam 202 engages a follower 204 carried by a link 206 which is connected to a lever 208. When the lever is moved on its pivot by the engagement of the follower and the cam, it moves the stem of valve 200 against the action of spring 210, as shown in Fig. 24, to open it and permit passage of air from pipe 198 to pipe 164. This occurs at the moment the die is stationary and while the vacuum source is disconnected, the die having completed its movement to the right and just before it starts its movement to the left. A jet of air is thus delivered from each of the ports 6 to release the rolled foil from the mandrel. The mandrel meanwhile starts rotating in the opposite direction. The period of time that the valve 200 is opened must therefore be controlled and must end before the ports 6 come opposite the inner free edge of the rolled foil in the die. Otherwise the air jet might pass beneath the edge and between the layers of the foil, or otherwise disturb the coil.

The fusing nozzle is shown in detail in Figs. 19 and 20 of the drawings. The nozzle C is of a length substantially equal to, or slightly greater than, the length of the tube and is provided with an axial passage 212 to convey heated air to a head 214 arranged on the end of the nozzle. The end of the tube forming the nozzle proper is reduced to form a shoulder 216 and the head 214 slides over the reduced end and abuts this shoulder. It is held in place by a bolt 218 and washer 220. Axial passage 212 communicates with the interior of the head through ports 222 and the head is provided with a plurality of rows of radial ports 224 by means of which the heated air is brought into contact with the rolled sheet in the die to expand it against the walls of the die and to seal the layers of material to each other. A screen 226 may be arranged in the head between the ports 222 and the ports 224 to remove foreign matter from the air.

Air under pressure from the pump 196 is delivered to a heater 228 by pipe 230 and from the heater it passes to a control valve 232 arranged on the machine adjacent the fusing nozzle as shown in Fig. 1. The valve 232 may be of any suitable construction and is provided with an outlet 234 connected to the end of the fusing nozzle. The valve member is provided with a stem 236 and is normally retained in closed position by spring 240 which surrounds the valve stem. End of the valve stem bears against a lever 242 which is pivoted on the frame of the machine at 244 and carries a cam roller 246 on its opposite end. Roller 246 engages a cam bar 248 which is mounted on the die carriage. The cam bar is secured to the die carriage by bolts and is preferably provided with elongated slots to permit adjustment of the cam bar and thus permit adjustment of the timing of the valve 232. Throughout a portion of its length the cam bar 248 is provided with a straight face 252, parallel with the line of travel of the carriage and of the proper length to hold the valve 232 in open position during the time required to effect fusing. When the carriage has passed over the fusing nozzle from the right to the left and returned to the position where the carriage is about to pass from the nozzle, the follower 246 passes on to a relief section 254 of the cam and permits the valve to close under the action of spring 240. As the carriage moves to the left, with the die over the nozzle, and reaches the end of its movement, there is a slight dwell before it starts its return movement. To prevent overheating of the end of the tube which is over the nozzle during this period, cam bar 248 is provided with a relief portion 255, which permits momentary closing of the valve by spring 240. Thus overheating of the end of the tube and loss of heated air is prevented.

Figs. 3 and 4 of the drawings illustrate an alternative method of operating the valve 232. By placing the valve 232 on the machine at a point adjacent the shaft 94, the valve may be controlled by a cam 256 mounted on the shaft 94. Cam 256 is engaged by a follower 258 on a lever 260 which is mounted on a rock shaft 262. Rock shaft 262 carries an arm 264 which engages the valve stem as shown to actuate the valve.

As the die containing the fused tube moves from left to right over the mandrel, the plug 132 engages the end of the tube as shown in Fig. 20 and as heretofore explained and the continued movement of the die ejects the tube as illustrated in Figs. 21 and 22. A plate 270 is arranged on the frame of the machine in the portion between the mandrel and the fusing nozzle (see Fig. 1) and as the tube T is pushed from the die by the plug, it falls upon this plate with the left end of the tube reaching the plate first. Plate 270 carries lugs 272 by means of which it is pivotally mounted on a rod 274 journalled in the brackets 276 on the frame of the machine. A spring 278 surrounds the rod 274, the spring having one end secured to the rod and having the other end engaging the bottom of the plate to urge it to the horizontal position shown in dotted lines in Fig. 22 of the drawings. A stop 280 limits the movement of the plate. A discharge chute 282 is arranged in alignment with the plate and a rod 284 (see Fig. 2) extends across the bottom of the chute to prevent the tubes from rolling off the chute.

When there is no tube on the plate 270, the plate is in the horizontal position shown in dotted lines in Fig. 22. As one end of the tube is lowered on to the plate, or the tube falls completely upon the plate, it remains there due to the horizontal position of the plate until the plate is tipped to the full line position shown in Fig. 22 by a cam 284 mounted on the carriage B. When the plate is thus tilted to the full line position, the tube rolls down the chute and when a number of them have collected at the bottom of the chute, they may be removed by an operator. If the inclined chute extended immediately under the die and directly received the tubes, they would frequently start down the chute in an angular position, thus engaging the side walls 286 of the chute and clogging the chute.

The carriage B, on which the die is mounted, includes a horizontal plate 288 having three bearings 290 which slidably support it on a pair of horizontal parallel rails 292. The die is secured to the carriage by means of bolts 294 mounted in brackets 296 carried by the plate 288 (see Figs. 2, 13 and 14).

The spring fingers 24 which guide the foil around the mandrel would normally be in the path of travel of the die and to permit passage of the die, the ends of the fingers are provided with tabs 298 which are engaged by a cam surface 300 on the end of the die to move the fingers downwardly out of the path of the die (see Fig. 12).

A safety gate is provided on the carriage at the right end of the die. As the die with the rolled foil in it moves to the left and comes close to or over the heating nozzle, the blast of air from the nozzle may blow the wound foil out of the die. This is particularly true if a corner of the advanced end of the rolled foil should be loose or bent over. Also as the die returns toward the mandrel, the blast is sufficiently strong and of such a high temperature that, if allowed to blow on the plug 132, the latter, if made of rubber, becomes softened to the point of stickiness. The gate of course must be opened when the die is traveling over the mandrel and it is therefore pivotally mounted. As shown (see Figs. 11, 12 and 18), the gate 302 is substantially the size of the die opening and is provided with angularly disposed fins 304 to direct the heated air from the fusing nozzle backwardly away from the operator and away from the other parts of the machine. The gate is carried by an arm 306 and this arm is pivoted on a second arm or bracket 308 carried on the end of the die. The arm 306 is provided with a cam follower 310 which is adapted to engage a cam track. This cam track is in the form of a bar 312 (see Figs. 1 and 11) having cam portions 314 and 316 which are engaged by the follower 310 to open the gate at the proper times. When the cam follower is out of engagement with both the cam 314 and the cam 316, the gate is swung to a closed position by a spring 318.

As heretofore stated, the bellows 158 is adapted to release the link 146 from the lever 138 when there is no tube in the die as it moves to the right over the mandrel. This is accomplished by means of a connection to an orifice in the die from the vacuum line. As shown (see Fig. 23) a branch line 320 extends from the vacuum line and connects to pipe 322 which is connected to the bellows 158 and to the die through an orifice 324 (see Fig. 14). The orifice in the die is of larger diameter than the connection to the bellows, thus the former may be of a diameter of about .052" and the latter of a diameter of about .040". This orifice is preferably adjustable so as to regulate the speed at which the Sylphon operates. If desired a needle valve may be substituted. In operation when a foil is in the die and closes the orifice, the vacuum connection through pipe 322 maintains sufficient degree of vacuum in the bellows to raise the link 146 to its operative position. However, if no foil is present in the die, the vacuum will leak through the orifice 324 to a sufficient extent to prevent the bellows from lifting the link 146 and the latch will thus be released. Under normal operating conditions, the latch remains constantly locked as the response between cycles is too slow to cause intermittent opening and closing.

The operation of the machine will be apparent from the foregoing description. With the parts in the full line position shown in Fig. 1 of the drawings, the mandrel 4 is just about to be rotated by cam 110 and an operator feeds a sheet of material over the table to be wound about the mandrel. The valve 170 is at that time actuated by lever 186 and cam 194 to connect the chamber 162, and thus the ports 6 to the source of suction. While the machine is in no way limited to the type of material used in making tubes nor to the number of layers of which the tube is formed, we have heretofore used the machine in the manufacture of tubes from aluminum foil coated with a thermoplastic material, such as vinyl resin, and have made a tube of two layers of this material. The sheets fed over the table 20 are therefore of a width substantially equal to twice the circumference of the tube to be made and of a length substantially equal to or a little greater than the length of the final tube. When the follower 120 passes on to the concentric portion of the cam 110, rotation of the mandrel is stopped and at this time the valve 170 also disconnects the mandrel from the source of suction. Engagement of roller 98 with cam 104 moves the carriage and die over the mandrel and as the carriage reaches its extreme position to the right as shown at D in dotted lines in Fig. 1 of the drawings, the ports 6 are connected to the pump through conduit 198 and the valve 70 to deliver a blast of air and cause the rolled material to adhere to the die. The cams 100 and 102 then move the die to the left over the fusing nozzle C. As the die starts over the fusing nozzle the valve 232 is opened to deliver heated air to the nozzle head. The heated air flows out of the ports 222 and 224 against the interior of the roll of material in the die causing it to expand against the inner cylinder 46 and to be sealed by the thermoplastic resin with which the material is coated. Each part of the tube is sealed as the die moves over the fusing nozzle first to the left and then to the right. As stated, the cam portions 104 and 106 are designed to cause rapid preheat movement of the die as it moves over the heating nozzle and slower movement when returning to the right to give a longer final or sealing treatment.

During the period of time that the die has been moving over the fusing nozzle, the mandrel is rotated in a reverse direction to bring the ports 6 in the proper position to exert suction on a sheet of foil fed over the table 20 by the operator and as the die moves off the fusing nozzle, the mandrel is again rotated with the suction on to wind another sheet of material on it. When the die reaches the position with its right end over the left end of the mandrel, the plug 134 is expanded by operation of lever 138 and pushes the completed tube from the die as indicated in Fig. 20. The tube falls on to the pivoted plate 270 and eventually rolls down the inclined chute 282 as heretofore described.

We claim:

1. Apparatus for forming tubes from sheet material comprising means for rolling the sheet material into tubular form, a die to receive the rolled sheet, and a fusing nozzle in alignment with the die, means for moving the die and fusing nozzle relatively to each other to position the die over the fusing nozzle, and means to deliver heated air to the interior of the rolled form to cause it to expand into contact with the wall of the die.

2. Apparatus for forming tubes from sheet material comprising a mandrel, means for rotating the mandrel to roll a sheet of material around the mandrel, a die arranged in alignment with the mandrel, means for moving the die and the mandrel relatively to each other to bring the die over the mandrel to receive the rolled form, a fusing nozzle in alignment with the die, means for moving the die and the fusing nozzle relatively to each other to bring the die over the fusing nozzle, and means for delivering fluid from the fusing nozzle into the rolled form in the die to expand the rolled form against the wall of the die.

3. Apparatus for forming tubes from sheet material comprising a fusing nozzle, a rotatable mandrel in alignment with the fusing nozzle, a carriage arranged between the fusing nozzle and the mandrel having a die in axial alignment with the fusing nozzle and the mandrel, means for reciprocating the carriage to position the die alternatively over the mandrel and the fusing nozzle, means for rotating the mandrel to wind a sheet of material fed to the mandrel into a roll of a plurality of layers, and means for delivering fluid to the fusing nozzle to expand the rolled form against the wall of the die.

4. Apparatus for forming tubes from sheet material comprising a fusing nozzle, a rotatable mandrel in alignment with the fusing nozzle, a carriage arranged between the fusing nozzle and the mandrel having a die in axial alignment with the fusing nozzle and the mandrel, means for reciprocating the carriage to position the die alternatively over the mandrel and the fusing nozzle, means for rotating the mandrel to wind a sheet of material fed to the mandrel into a roll of a plurality of layers, the mandrel being provided with ports, means for connecting the ports to a source of suction, and means for delivering heated fluid to the fusing nozzle to expand the rolled form against the wall of the die.

5. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, and an expansible member arranged on the end of the mandrel to engage a tube in the die as the die moves over the mandrel to eject the tube from the die.

6. In apparatus for forming tubes from sheet material, a fusing nozzle, a reciprocating die adapted to carry a roll of material over the fusing nozzle, the nozzle being provided with openings to discharge heated fluid into the roll of material, a valve to control flow of fluid to the nozzle, and means operable by movement of the die to actuate the valve.

7. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member associated with the mandrel to engage a tube in the die as the die moves over the mandrel to eject the tube from the die, a member movable relatively to the mandrel and operable to expand said expansible member, and means for moving the member.

8. Apparatus for forming tubes from sheet material comprising a fusing nozzle, a rotatable mandrel in alignment with the fusing nozzle, a carriage arranged between the fusing nozzle and the mandrel having a die in axial alignment with the fusing nozzle and the mandrel, means for reciprocating the carriage to position the die alternatively over the mandrel and the fusing nozzle, means for rotating the mandrel to wind a sheet of material fed to the mandrel into a roll of a plurality of layers, means for delivering fluid to the fusing nozzle to expand the rolled form against the wall of the die, a cam shaft, a cam mounted on the shaft and operatively connected to the die to reciprocate it, a valve to control the flow of fluid to the fusing nozzle, and means to operate the valve.

9. Apparatus for forming tubes from sheet material comprising a fusing nozzle, a rotatable mandrel in alignment with the fusing nozzle, a carriage arranged between the fusing nozzle and the mandrel having a die in axial alignment with the fusing nozzle and the mandrel, means for reciprocating the carriage to position the die alternatively over the mandrel and the fusing nozzle, means for rotating the mandrel to wind a sheet of material fed to the mandrel into a roll of a plurality of layers, means for delivering fluid to the fusing nozzle to expand the rolled form against the wall of the die, a cam shaft, a cam mounted on the shaft and connected to the die to reciprocate it, a valve to control the flow of fluid to the fusing nozzle, and a cam carried by the die to actuate the valve.

10. Apparatus for forming tubes from sheet material comprising a fusing nozzle, a rotatable mandrel in alignment with the fusing nozzle, a carriage arranged between the fusing nozzle and the mandrel having a die in axial alignment with the fusing nozzle and the mandrel, means for reciprocating the carriage to position the die alternatively over the mandrel and the fusing nozzle, means for rotating the mandrel to wind a sheet of material fed to the mandrel into a roll of a plurality of layers, means for delivering fluid to the fusing nozzle to expand the rolled form against the wall of the die, a cam shaft, a cam mounted on the shaft and connected to the die to reciprocate it, a valve to control the flow of fluid to the fusing nozzle, and a cam on the cam shaft to operate the valve.

11. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member arranged at an end of the mandrel to engage a tube in the die as the die moves over the mandrel to eject the tube from the die, a rod mounted in the mandrel and capable of longitudinal movement with respect to the mandrel to expand said expansible member, means for moving the rod, a cam shaft and a cam mounted on the shaft and connected to the rod to actuate the rod.

12. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member associated with the mandrel to engage a tube in the die as the die moves over the mandrel to eject the tube from the die, a rod mounted in the mandrel and capable of longitudinal movement with respect to the mandrel to expand said expansible member, means for moving the rod, a cam shaft, a cam mounted on the shaft and connected to the rod to actuate the rod, and a cam on the cam shaft to reciprocate the die.

13. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member arranged on the end of the mandrel to engage a tube in the die as the die moves over the mandrel to eject a tube from the die, a rod mounted in the mandrel and capable of longitudinal movement with respect to the mandrel to expand said expansible member, means for moving the rod including a pivoted lever connected to the rod, and a cam to actuate the pivoted lever.

14. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member arranged on the end of the mandrel to engage a tube in the die as the die moves over the mandrel to eject the tube from the die, a rod mounted in the mandrel and capable of longitudinal movement with respect to the mandrel to expand said expansible member, means for moving the rod including a pivoted lever connected to the rod, a cam to actuate the pivoted lever, and means for disconnecting the lever from the cam when the die is arranged over the mandrel and does not contain a tube therein.

15. In apparatus for forming tubes from sheet material, a mandrel, a fusing nozzle in alignment with the mandrel, a carriage arranged between the fusing nozzle and the mandrel and having a die in axial alignment with the fusing nozzle and the mandrel, means for rotating the mandrel, means for delivering fluid to the fusing nozzle, and a cam to move the carriage to bring the die alternatively over the mandrel and the fusing nozzle, the speed of movement of the carriage and die on the portion of the cycle when the die is leaving the fusing nozzle being different than the speed of movement when the die is moving over the fusing nozzle.

16. In apparatus for forming tubes from sheet material, a mandrel, a fusing nozzle in alignment with the mandrel, a carriage arranged between the fusing nozzle and the mandrel and having a die in axial alignment with the fusing nozzle and the mandrel, means for rotating the mandrel, means for delivering fluid to the fusing nozzle, a cam to move the carriage to bring the die alternatively over the mandrel and the fusing nozzle, the speed of movement of the carriage and die on the portion of the cycle when the die is leaving the fusing nozzle being different than the speed of movement when the die is moving over the fusing nozzle, a valve to control the delivery of fluid to the fusing nozzle, and a cam to actuate the valve.

17. In apparatus for forming tubes from sheet material, a mandrel, a fusing nozzle in alignment with the mandrel, a carriage arranged between the fusing nozzle and the mandrel and having a die in axial alignment with the fusing nozzle and the mandrel, means for rotating the mandrel, means for delivering fluid to the fusing nozzle, a cam to move the carriage to bring the die alternatively over the mandrel and the fusing nozzle, the speed of movement of the carriage and die on the portion of the cycle when the die is leaving the fusing nozzle being greater than the speed of movement when the die is moving over the fusing nozzle, a valve to control the delivery of fluid to the fusing nozzle, and a cam carried by the carriage and engaging the stem of the valve to actuate the valve.

18. Apparatus for forming tubes from sheet material comprising a mandrel, the mandrel being provided with a plurality of ports, means for connecting the ports to a source of suction, means for rotating the mandrel to roll a sheet of material around the mandrel, a die arranged in alignment with the mandrel, means for moving the die and the mandrel relatively to each other to bring the die over the mandrel to receive the rolled form, a fusing nozzle in alignment with the die, means for moving the die and the fusing nozzle relatively to each other to bring the die over the fusing nozzle, and means for delivering fluid from the fusing nozzle into the rolled form in the die to expand the rolled form against the wall of the die.

19. In apparatus for forming tubes from sheet material, a mandrel, a die in alignment with the mandrel, means for rotating the mandrel, the mandrel being provided with a plurality of ports, means for connecting the ports to a source of suction, means for moving the die and mandrel relatively to each other to position the die over the mandrel, an expansible member arranged on the end of the mandrel to engage a tube in the die as the die moves over the mandrel to eject the tube from the die, a fusing nozzle arranged in alignment with the die and mandrel, means for moving the die and fusing nozzle relatively to each other to position the die over the mandrel, and means for delivering heated fluid to the fusing nozzle.

20. Apparatus for forming tubes from sheet material comprising a mandrel upon which a sheet of the material is wound, a fusing nozzle aligned with and spaced from said mandrel, a die movable over the mandrel to receive the wound material therefrom and carry it thence over the fusing nozzle, a movable gate, and means to shift said gate across an open end of said die as it leaves said mandrel to retain said wound material in said die as the latter travels to and passes over said nozzle.

21. Apparatus for forming tubes from sheet material comprising a mandrel upon which a sheet of the material is wound, a fusing nozzle aligned with and spaced from said mandrel, a die movable over the mandrel to receive the wound material therefrom and carry it thence over the fusing nozzle, means to shift said gate across an open end of said die as it leaves said mandrel to retain said wound material in said die as the latter travels to and passes over said nozzle, and means for shifting said gate away from said end of said die as said nozzle is about to protrude from said end of said die.

22. Apparatus for forming tubes from sheet material comprising a mandrel upon which a sheet of the material is wound, a fusing nozzle aligned with and spaced from said mandrel, a die movable over the mandrel to receive the wound material therefrom and carry it thence over the fusing nozzle, a movable gate, means to shift said gate across an open end of said die as it leaves said mandrel to retain said wound material in said die as the latter travels to and passes over said nozzle, said gate being also movable away from said end of said die as the latter is about to again pass over said mandrel, and means for so shifting said gate.

HOWARD GEORGE ALLEN.
CHARLES DELLINGER THOMAS.

REFERENCES CITED

The following references are of record in the file of this patent:

UNITED STATES PATENTS

| Number | Name | Date |
|---|---|---|
| 230,177 | Decoufle | July 20, 1880 |
| 914,384 | Chesney | Mar. 9, 1909 |
| 1,284,297 | Frederick | Nov. 12, 1918 |
| 1,794,692 | Hyde | Mar. 3, 1931 |
| 2,062,321 | Levin | Dec. 1, 1936 |